US006765213B2

(12) United States Patent
Shahar et al.

(10) Patent No.: US 6,765,213 B2
(45) Date of Patent: Jul. 20, 2004

(54) GAMMA-RAY DETECTOR FOR COINCIDENCE DETECTION

(75) Inventors: Arie Shahar, Moshav Magshimim (IL); Uri El-Hanany, Rehovot (IL); Alex Tsigelman, Petach Tikva (IL); Shimon Klier, Savion (IL); Eldan Halberthal, Mazor (IL)

(73) Assignee: Imarad Imaging Systems Ltd., Rehovot (IL)

( * ) Notice: Subject to any disclaimer, the term of this patent is extended or adjusted under 35 U.S.C. 154(b) by 317 days.

(21) Appl. No.: 09/918,371

(22) Filed: Jul. 30, 2001

(65) Prior Publication Data

US 2002/0036269 A1 Mar. 28, 2002

(30) Foreign Application Priority Data

Jul. 30, 2000 (IL) ................................................ 137579

(51) Int. Cl.[7] ................................................ G01T 1/24
(52) U.S. Cl. ............................ 250/370.09; 250/370.01; 250/370.08
(58) Field of Search ........................ 250/370.01, 370.03, 250/370.08, 370.09, 370.14, 370.1

(56) References Cited

U.S. PATENT DOCUMENTS 5,677,539 A    10/1997    Apotovsky et al. .... 250/370.13
6,034,373 A    3/2000    Shahar et al. .......... 250/370.01
6,169,287 B1 *  1/2001    Warburton ............... 250/370.1

OTHER PUBLICATIONS

"Signals induced in semiconductor gamma–ray imaging detectors", by J.D. Eskin et al., Published in journal of applied Physics, vol. 85, pp. 647 (1999).
"Charge loss between contacts of CdZnTe pixel detectors", by A.E. Bolotnikov et al., Published in Nuclear Instruments and Methods in Physics Research A, vol. 432, pp. 326–331. (1999).

* cited by examiner

Primary Examiner—Constantine Hannaher
Assistant Examiner—Timothy Moran
(74) Attorney, Agent, or Firm—Darby & Darby (57) ABSTRACT

A semiconductor coincidence detector device including at least a first and a second detector crystal array, each having a first and second surface, an array of pixellated anodes formed on each of the first surfaces, an array of segmented cathodes formed on each of the second surfaces, essentially each of the pixellated anodes being connected to an anode electronic channel for generating a first electrical signal corresponding to the energy of a photon impinging in the semiconductor, and essentially each of the segmented cathodes being connected to a cathode electronic channel for generating an electrical coincidence trigger signal on detection of a photon impinging in the semiconductor, the first electrical signal being read only from anodes located opposite the cathode segment generating the trigger signal.

17 Claims, 10 Drawing Sheets

GAMMA-RAY DETECTOR FOR COINCIDENCE DETECTION

FIELD OF THE INVENTION

The invention relates to the field of gamma-ray detectors, and especially gamma-ray detectors using the method of coincidence detection of positron emission for nuclear medical imaging.

BACKGROUND

Coincidence detection methods for positron emission, also known as electronic collimation, is used in the field of nuclear medical imaging. In this method isotopes that emit positrons are injected into the body of the examined patient. Each of the emitted positrons annihilates with an electron to produce a pair of 511 Kev photons propagating along the same line but in opposite directions and out of the patient's body. The 511 Kev photons are detected by a camera which has two separate detector heads, which determine the position where the photons interact with the detector heads and the energy of these interacting photons.

Only pairs of photons with both of their measured energies within the predetermined energy range 511+/−ΔE Kev are suitable for composing the image. The positions of interaction of these photons in the plane of the two separate detector heads define a line, which passes through the location of the point of origin of the electron-positron emission in the patient's body. By deriving these lines from the useful photons measured, an image can be constructed from the calculated positions of origin of the pairs.

Photons with measured energy of 511+/−ΔE Kev are used for acquiring the image, where ΔE is a predetermined energy range, which depends, among other factors, on the energy resolution of the camera and on the quality of the desired image. Photons with measured energy outside of the range of 511+/−ΔE Kev are probably photons that lost part of their energy by a scattering process in the patient body known as Compton scattering. Compton scattering changes the path of photons from the original orientation in which they were emitted by the annihilation process. Accordingly, photons that have undergone Compton scattering are not suitable for image acquisition, and the image-processing unit of the camera thus ignores them.

Photons of the same pair are emitted simultaneously. Accordingly, the detection time of one photon of a pair should differ from the detection time of the second photon, only by a very small time interval Δt which depends, among other factors, on the time resolution of the system, and on the different time of flight of each photon to its corresponding detector head.

The rate of the measured events in the detector heads determines the average time ΔT between two followings events. Two photons are considered as being related to the same pair when they are detected by the two detector heads of the camera within a time difference Δt, which satisfies the condition Δt<ΔT.

Accordingly, measuring the detection times of the photons by the detector heads implies that two photons (one in each head) are related to the same pair, when Δt<ΔT.

For more accurate imaging, the exact location of the electron-positron emission point on the above-derived lines, can be found from the calculations of the time of flight Δt1 and Δt2 of the photons, from their emission sites to the two detector heads.

In a typical coincidence method Δt is approximately 10 nanoseconds. This means that the time-resolving capability of the camera in measuring the interaction time of the photons with the detector heads should also be better than 10 nanoseconds.

In Anger cameras in which the photon detection is done by a combination of scintillator and photomultipliers, a time resolution of 10 nanoseconds is achieved on a regular basis.

In a pixellated solid-state detector array, the rise-time of the signal in the pixellated anodes depends on the weighting potential (commonly known as the "small pixel effect"), as described in the article entitled "Signals induced in semiconductor gamma-ray imaging detectors" by J. D. Eskin et al., published in Journal of Applied Physics, Vol. 85, pp. 647ff. (1999), hereby incorporated in its entirety by reference. The weighting potential depends mainly on the ratio between the dimensions of the anodes and the detector thickness. For example, in a typical pixellated solid-state detector, made of CdZnTe and designed for coincidence method use, the above-mentioned ratio is about 1/4 (2.5 mm anode size in a 10 mm detector thickness). In this situation the interaction time measured by the anodes depends strongly on the depth of interaction in the semiconductor. As a consequence, the anodes would measure two different events that occur simultaneously but at different depth of interaction, as if they occurred at different times. For the specific example of the detector mentioned above, the error in measuring the time of interaction by the anodes, can be as large as 1 microsecond.

An error of 1 microsecond in measuring the time of interaction is totally unacceptable for a coincidence measurement method, where the measurement should have a time resolution of 5 nanosecond.

An alternative technique for using the coincidence method with pixellated semiconductor detectors is to derive the time of interaction from the signal produced by the cathode of the detector head. The cathode is very big in comparison to the pixellated anodes and thus the small pixel effect in this case is negligible. The signal produced by the cathode is effectively instant and the time of interaction measured by this signal is thus independent of the depth of interaction.

However, the use of the detector head cathode for measuring the time of interactions introduces two major problems:

1. The large cathode suffers from a large dark current that produces a high noise level. The high level of noise in the cathode may cause a significant error in measuring the time of interaction.

2. Even though the time of coincidence is measured accurately using the cathode signals, there is still a problem of how to define the correct anodes to which the coincident signals belong. Anodes detecting two events that may occur up to 1 microsecond apart, may detect these events as occurring at inaccurate times and even in the reverse order to their true occurrence, because of the interaction depth delay.

There therefore exists a serious need for a device and method for deriving a low noise signal by which the interaction time of a photon with a pixellated semiconductor detector head can be accurately measured independently of the depth of interaction. At the same time, the device and method should be capable of determining to which one of the signals of the pixellated anodes of the semiconductor detector each coincidence signal is related.

The disclosures of each of the publications mentioned in this section and in other sections of the specification, are hereby incorporated by reference, each in its entirety.

SUMMARY OF THE INVENTION

The present invention seeks to provide a new gamma ray detector which has a sufficiently fast response time for any impacting photon that it is able to detect coincidence events accurately, and which is capable of identifying the correct pixellated anodes in the camera heads to which the coincidence events are related, and which also operates at a low dark current noise level.

According to one preferred embodiment of the present invention, this objective is achieved by means of a detector array having segmented cathodes, the area of each segment being large enough not to engender small pixel effects which would slow down the time of response of the cathode, and having pixellated anodes of the dimensions required to provide the desired resolution of the detector array. The segmented cathodes provide a fast coincidence signal, including the location address of the cathodes impacted by the coincident photons, and this coincidence signal is used to read the charge signals detected only on those pixellated anodes located behind the cathodes providing the coincidence signal. Each cathode area is sufficiently small, on the other hand, that there is very low likelihood of having two events occurring within the group of anodes behind those cathodes, within the time that it takes to readout the slowest responding impact on those anodes because of the small pixel effect.

According to further preferred embodiment of the present invention, instead of the segmented cathodes being used to provide the fast coincident trigger data, a segmented grid array on the anode side of the detector, and located between the individual anodes, may be used. Such a grid has been previously described in U.S. Pat. No. 6,034,373 to some of the inventors of the present application, hereby incorporated in its entirety by reference. The segmented grid covers a large effective area of the detector. The grid conductor itself is of smaller area but still does not engender small pixel effects, and furthermore, if used with an insulating base layer, is a non collecting electrode. Thus the grid provides a very low noise signal for the coincidence detection. Similar to the segmented cathodes, the segmented grid provides a fast coincidence signal, including the location address of the grid segment impacted by the coincident photons, and this coincidence signal is used to read the charge signals detected only on those pixellated anodes located within the grid segment providing the coincidence signal. Each area of a grid segment is sufficiently small, on the other hand, that there is very low likelihood of having two events occurring within the group of anodes, locating within the grid segment, in the time that it takes to readout the slowest responding impact on those anodes because of the small pixel effect. This geometry has a significant advantage in that the majority of the electrical connections can be made on one side of the detector array, thus simplifying design and construction.

There is further provided in accordance with yet another preferred embodiment of the present invention, a semiconductor coincidence detector device consisting of at least a first and a second detector crystal array, each having a first and second surface, an array of pixellated anodes formed on each of the first surface, an array of segmented cathodes formed on each of the second surface, essentially each of the pixellated anodes being connected to an anode electronic channel for generating a first electrical signal corresponding to the energy of a photon impinging in the semiconductor, and essentially each of the segmented cathodes being connected to a cathode electronic channel for generating an electrical coincidence trigger signal on detection of a photon impinging in the semiconductor, the first electrical signal being read only from anodes located opposite the cathode segment generating the trigger signal.

There is even further provided in accordance with yet another preferred embodiment of the present invention, a semiconductor coincidence detector device consisting of at least a first and a second detector crystal array, each having a first and second surface, an array of pixellated anodes formed on each of the first surface, an array of segmented grids formed on each of the first surface, essentially each of the pixellated anodes being connected to an anode electronic channel for generating a first electrical signal corresponding to the energy of a photon impinging in the semiconductor, and essentially each of the segmented grids being connected to a segmented grid electronic channel for generating an electrical coincidence trigger signal on detection of a photon impinging in the semiconductor, the first electrical signal being read only from anodes located within the area of the grid segments generating the trigger signal.

BRIEF DESCRIPTION OF THE DRAWINGS

The present invention will be understood and appreciated more fully from the following detailed description, taken in conjunction with the drawings in which:

FIGS. 1A and 1B illustrate a prior art pixellated semiconductor detector array and its time response.

FIGS. 3A and 3B are schematic illustrations of a further preferred embodiment of the present invention, showing an insulated grid between the pixellated anodes of a semiconductor detector array. This embodiment allows the deriving of fast pulses for coincidence purposes using electrical connections on the top anode side of the detector array, thus significantly simplifying detector construction. FIG. 3A is a cross-sectional side view, while

DETAILED DESCRIPTION OF PREFERRED EMBODIMENTS

Figure 1A:
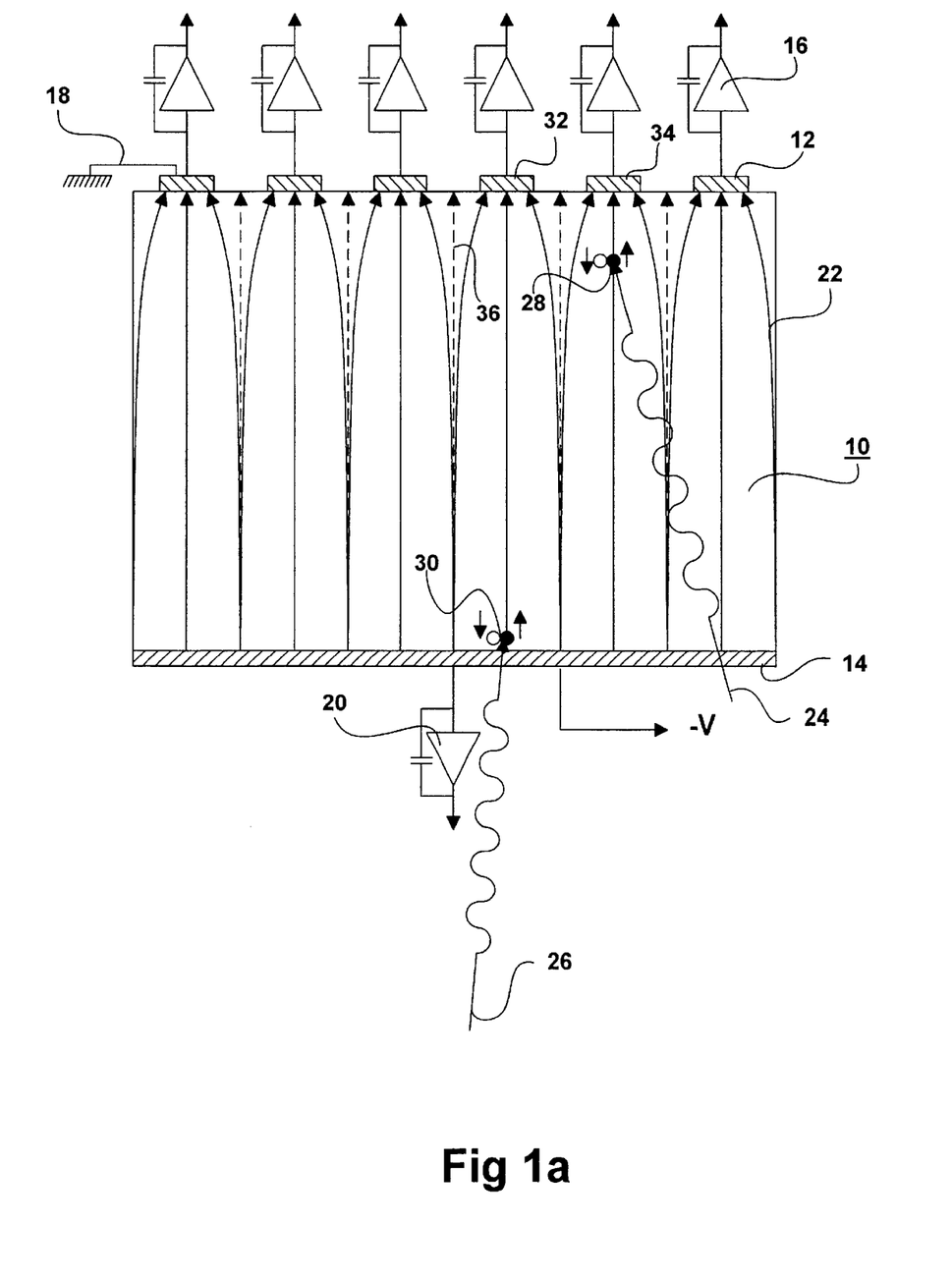
FIG. 1A is a schematic drawing showing the pixellated anodes and a single cathode, with the charge signal preamplifiers associated therewith.

Reference is now made to FIG. 1A, which is a schematic drawing of a prior art pixellated semiconductor array 10 having anodes 12 and a cathode 14. Each of anodes 12 is connected to an electronic channel including a charge sensitive preamplifier 16. All of the anodes 12 are maintained at ground potential 18. The cathode 14 is biased at a high negative potential −V, and has a charge sensitive preamplifier 20 connected for measuring the induced cathode charge. Field lines, one of which is labeled 22, schematically show the distribution of the electric field across the dielectric medium between the anodes 12 and the cathode.

The absorption of photons 24 and 26 in the semiconductor bulk of detector 10 creates electron-hole pairs 28 and 30, respectively. The electrons, illustrated by dark circles, drift along lines 22 and towards anode 12. The holes, illustrated by clear circles, drift along lines 22 and toward cathode 14.

The motion of the electrons and the holes of electron-hole pairs 28 and 30 produces an induction current in anodes 12 and cathode 14. Charge sensitive preamplifiers 16 and 20 respectively convert the current induced in anodes 12 and cathode 14 into electrical signals as voltage pulses in a form similar to a step-function. The amplitude of this voltage pulse is linearly proportional to the amount of the charge induced in the electrode to which the preamplifier is connected. The rise time and the amplitude of this voltage pulse is depend on the depth of interaction at which the photon that created the electron-hole pair is absorbed, and on the ratio between the electrode size and the thickness of the detector.

Broken lines 36 of the electric field exist only when the surface of the semiconductor between anodes 12 is not an ideal dielectric material but has some finite electrical conductivity. This effect is described in the article entitled "Charge loss between contacts of CdZnTe pixel detectors" by A. E. Bolotnikov et al, published in Nuclear Instruments and Methods in Physics Research A, Vol. 432, pp. 326–331 (1999). In a situation when the absorbed photons interact with the detector bulk in the region between the pixellated anodes, the cloud charge of the electron-hole pairs that they produce is shared between the neighboring pixels towards which the charge carriers drift. This shared signal can be reconstructed to derive the original energy of the absorbed photon, by total summing of the signals over all the relevant neighbors. Part of the cloud charge may drift along the lines 36 and meet the surface between anodes 12, and be lost there due to trapping and surface recombination. This lost charge cannot be recovered and in this case, it is impossible to derive the original energy of the absorbed photon by total summing of the signals over all the relevant neighbors.

Figure 1B:
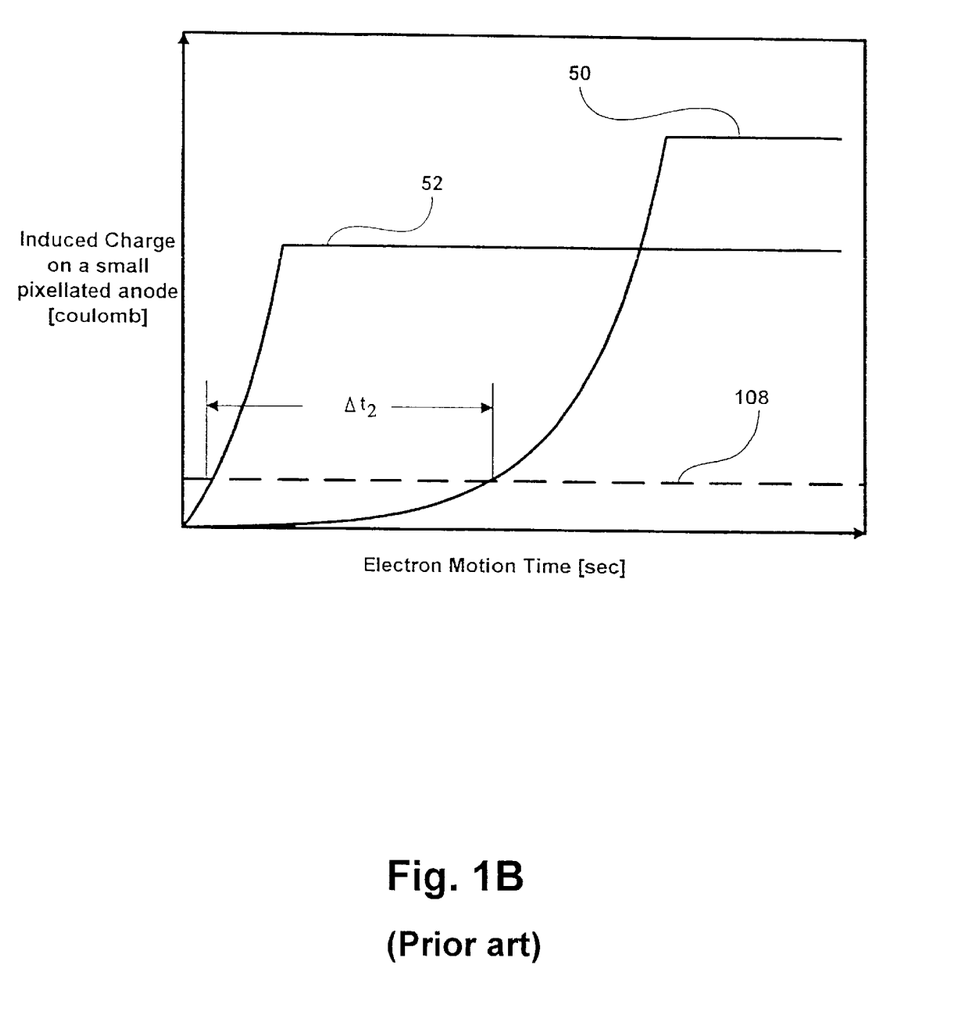
FIG. 1B is a graph of the time response of the induced charge on an anode, one arising from an interaction taking place close to the anode, and one close to the cathode.
Figure 1C:
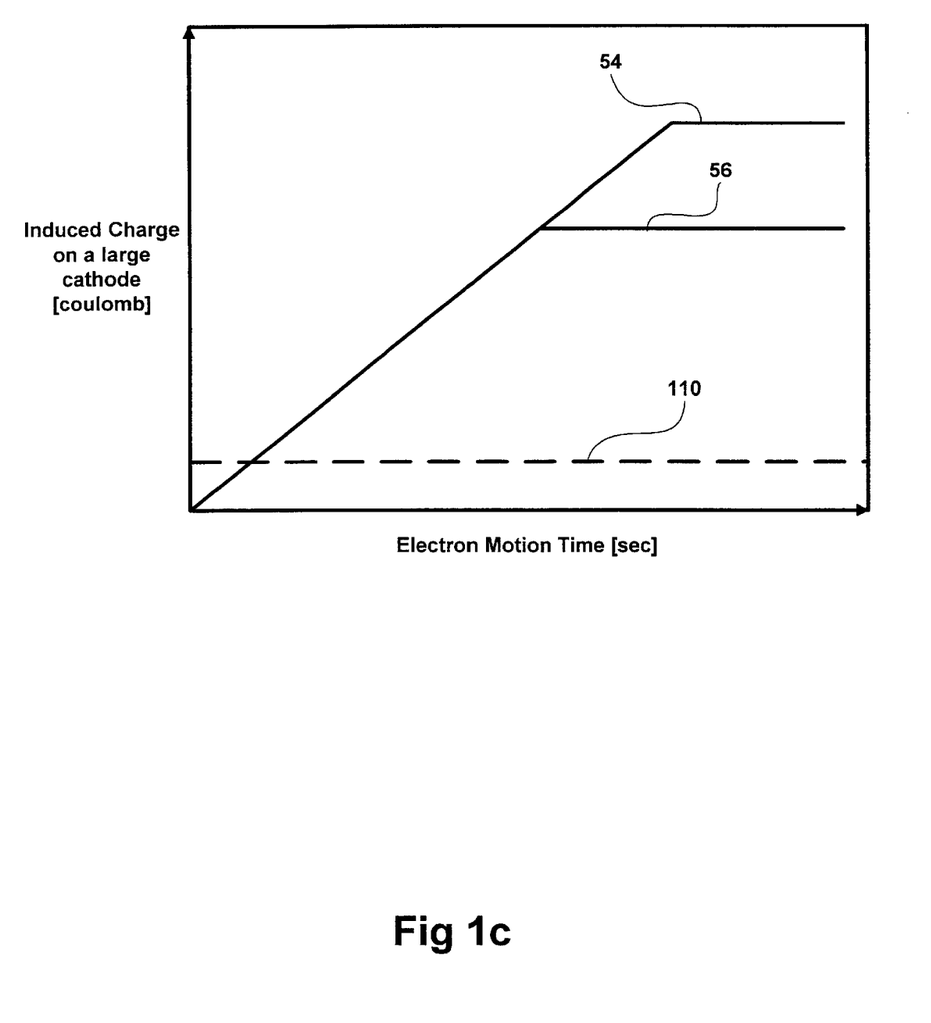
FIG. 1C is a graph of the time response of the induced charge on the cathode, illustrating how the response time is independent of the point of interaction of the photon.

Reference is now made to FIGS. 1B and 1C, which are graphs illustrating the development with time of the induced charge produced by preamplifiers 16 and 20 of prior art FIG. 1A. FIG. 1B is a graph of the induced charge on anodes 12, as measured by preamplifiers 16, versus the time of motion of the electrons of pairs 28 and 30. Curve 50 is related to the induced charge on anode 32 produced by the motion of the electron of pair 30. Similarly, curve 52 is the graph related to the induced charge on anode 34 produced by the motion of the electron of pair 28.

FIG. 1C is a graph of the induced charge on cathode 14, as measured by preamplifiers 20, versus the time of motion of the electrons of pairs 28 and 30. Curve 54 is the graph related to the induced charge on cathode 14 produced by the motion of the electron of pair 30. Similarly, curve 56 is the graph related to the induced charge on anode 34 produced by the motion of the electron of pair 28.

FIGS. 1B and 1C show the induced charge produced only by the motion of the electrons while ignoring the contribution of the holes. The contribution of the moving holes to the induced charge may be ignored for the following reasons:

(a) The holes have a very low mobility in comparison to the electron mobility and thus, most of them are trapped and recombine within the detector bulk without contributing significantly to the induced charge.

(b) Those holes which are not trapped and recombined, move so slowly that the rise time of the induced charge that they produce is much slower than the time constant of the shapers that follow the charge sensitive preamplifiers. Thus, the hole contribution to the signal following the shaper is negligible in any case.

Curve 50 of the induced charge produced by the electron motion of pair 30, rises slowly at the beginning of the electron motion and then more sharply at the end of the electron motion. This behavior is due to the small pixel effect, as described in the above-mentioned article by Eskin et al. This effect is significant when the dimension d of anodes 12 is significantly less than the thickness S of detector 10, i.e. $d/S \ll 1$.

According to this effect when the electron motion takes place far away from anodes 12 (at a distance greater than about 2d), the induced charge is very small and almost negligible. This situation is related to the first region of curve 50 where the induced charge goes up slowly with the time of motion of the electron. When the electron of pair 30 reaches the vicinity of anodes 12 (anode 32 for the particular case illustrated) at a distance that is smaller than 2d, the induced charge becomes very efficient. This situation is related to the second part of curve 50 where the induced charge goes up rapidly with the time of motion of the electron. The third part of curve 50 is flat. This part relates to the time after the arrival of the electron at the anode 32 where it is collected and no longer contributes to an increasing charge.

Curve 52 of the induced charge produced by the electron motion of pair 28, rises immediately with a sharp increase of the induced charge. This behavior is due to the small distance (smaller than 2d) from anodes 12 (anode 34) at which the electron starts its motion. Thus, the electron, from the outset of its motion, is in a region where the induced charge is significant, since the ratio between size d of anodes 12 and the effective thickness S of detector 10 remaining to the anode surface satisfies the relationship $d/S \sim 1$. This situation is related to the first part of curve 52 and is similar to the second part of curve 50 where the induced charge goes up rapidly with the motion time of the electron. The second part of curve 52 is flat. This part relates to the time after the arrival of the electron to anode 34 where it is collected by that anode.

The induced charge can be detected electronically when it reaches a certain threshold 108. It can be seen that even if the motion of the electrons of pairs 28 and 30 were to start simultaneously, the induced charge that they produce on anodes 32 and 34, respectively, would be detected at a time difference $\Delta T_2$ which could be very significant. As an example, for a high energy detector made of 10 mm CdZnTe, the $\Delta T_2$ can be as long as 1 microsecond.

Curves 54 and 56 of FIG. 1C schematically show the induced charge on cathode 14 of the detector shown in FIG. 1A as a function of the time of motion of the electrons of pairs 28 and 30, respectively. Since the area of the cathode is much larger than the thickness S of detector 10, there is no small pixel effect for this electrode. Accordingly, the induced charge is linearly proportional to the amount of motion of the electrons, regardless of where the electrons start their motion. In this situation the starting point and the slope of curves 54 and 56 are identical. Curve 54 differs from curve 56 only in the value of its flat plateau region. This value is linearly proportional to the length of travel of the electrons. Thus the electron of pair 30 that travels a further distance to its destination anode 32 than the electron of pair 28 to its destination anode 34, produces a higher end plateau level of charge.

From curves 54 and 56, it can be seen that if the motion of the electrons of pairs 28 and 30 were to start simultaneously, the induced charge that they produce on cathode 14, would be detected at the same instant in time, since both of curves 54 and 56 cross the threshold 110 simultaneously.

Curves 54 and 56 demonstrate the known technique of deriving a fast trigger from a large cathode, which is independent of the depth of interaction of the absorbed photons within the detector bulk. This trigger is used to identify which events in the two different heads of a coincidence camera are related to the same pair of positron emission events. This identification is done according to the coincidence criteria that photons which are absorbed in two heads can be considered to be related to the same pair of positron emission events if their interaction occur within a time window $\Delta t$. $\Delta t$ is taken to be shorter than $\Delta T$, the average time between two successive events.

While the fast signals derived from large cathodes enable the measurements of time delays sufficiently short that they can function as coincidence triggers, there is still a problem in identifying to which anode pixels the coincidence events are related, since the timing of the signals collected by the anodes is significantly affected by the absorption depth. The fast signals from the large cathodes of the two different heads of the coincidence camera can detect a situation when two events in these heads occur within a time difference shorter than $\Delta T$, and are thus regarded as coincident. On the other hand the signals derived from the pixellated anodes are still dependent on the depth of interaction so that events occurring simultaneously may be detected at time differences of up to 1 microsecond, which is much longer than $\Delta T$. In such a situation events that occur in a certain order may well be detected in the reverse order.

As a result, even though the large cathodes of the heads of such prior art coincidence cameras detect coincidence events correctly, there is still a problem to find out to which of the pixellated anodes in the camera head these coincident events are related.

In addition, the use of large cathodes introduces a high level of noise due to the high dark current that such a large area electrode engenders. This high noise level interferes with proper operation of the coincidence technique.

Figure 2:
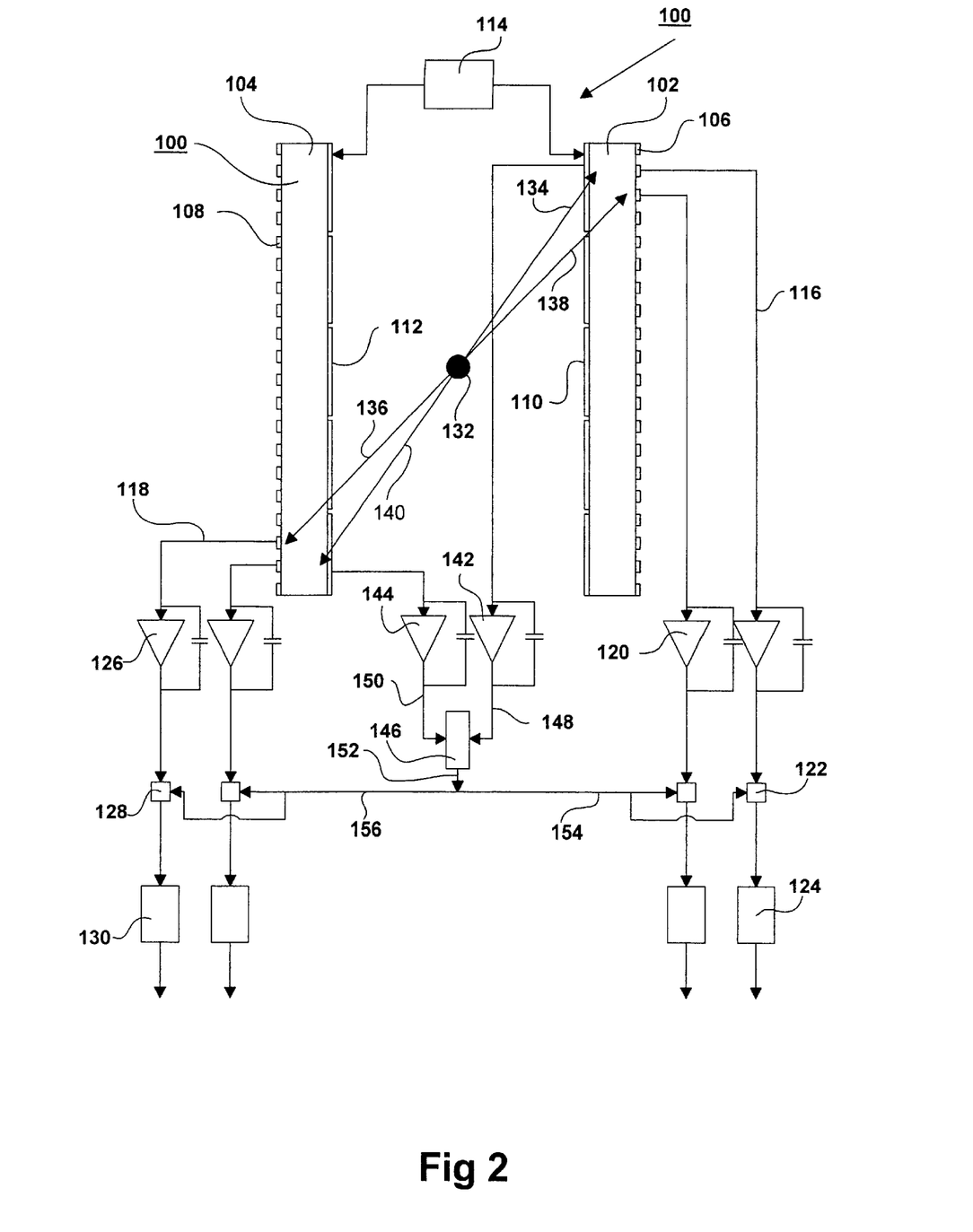
FIG. 2 is a schematic illustration of coincidence camera with two pixellated semiconductor detector array heads each having pixellated anodes and segmented cathodes, according to a preferred embodiment of the present invention.

Reference is now made to FIG. 2, which schematically illustrates a coincidence camera system, constructed and operative according to a preferred embodiment of the present invention, (i) which can measure impact times sufficiently fast that it is able to detect coincidence events accurately, (ii) which is capable of identifying the correct pixellated anodes in the camera heads to which the coincidence events are related, and (iii) which also operates at a low dark current noise level.

FIG. 2 shows coincidence camera 100, which includes two detector heads 102 and 104. Detector heads 102 and 104 are constructed of pixellated semiconductor detector arrays, such as, CdZnTe (CZT) pixellated detector arrays, and have pixellated anodes 106 and 108, respectively. Detector heads 102 and 104 having segmented cathodes 110 and 112, respectively. Segmented cathodes 110 and 112 are biased negatively by a high voltage power supply 114, while pixellated anodes 106 and 18 are maintained at ground or virtual ground potential. Each of pixellated anodes 106 is electrically connected to a separate electronic channel 116. Similarly each of pixellated anodes 108 is electrically connected to a separate electronic channel 118. Each of channels 116 includes a charge sensitive preamplifier 120, a gate 122, and a signal processing unit 124 including an amplifier, shaper, peak and hold, and analog to digital converter. Similarly, each of channels 118 includes a charge sensitive preamplifier 126, a gate 128, and a signal processing unit 130, including an amplifier, a shaper, a peak and hold circuit, and an analog-to-digital converter. The channel for each pixellated anode also output an address signal, for identifying the location of each anode signal measured.

Radiation source 132 contains an isotope that decays by positron emission resulting in annihilation emission of a pair of 511 Kev photons propagating along the same line but in opposite directions. Source 132 can represent the areas of where the isotope collects in a patient's body into which the above isotope was injected.

Photons 134 and 140 are a pairs of photons related to the same coincidence event, while photons 136 and 138 are related to another coincidence event.

Detector head 102 converts the energies of photons such as photons 134 and 138 absorbed in its bulk into induced charge on the various relevant pixellated anodes 106 and on the relevant segmented cathodes 110. The induced charge on anodes 106 and on cathodes 110 is transformed into electrical signals by charge sensitive preamplifiers 120 and 142, respectively. Detector head 104 converts the energies of photons such as photons 136 and 140 absorbed in its bulk into induced charge on pixellated anodes 108 and on segmented cathodes 112. The induced charge on anodes 108 and on cathodes 112 is transformed into electrical signals by charge sensitive preamplifiers 126 and 144, respectively.

Though not shown in FIG. 2, each of segmented cathodes 110 is electrically connected to a separate charge sensitive preamplifier 142, and each of segmented cathodes 112 is electrically connected to a separate charge sensitive preamplifier 144. All the outputs of charge sensitive preamplifiers 142 and 144 are respectively fed into inputs 148 and 150 of coincidence unit 146. Coincidence unit 146 has a single output 152 electrically connected to the control electrodes 154 and 156 of gates 122 and 128 of electronic channels 116 and 118, respectively.

Coincidence unit 146 produces a coincidence pulse at its output 152 whenever two electrical signals, derived from segmented cathodes 110, 112, by preamplifiers 142 and 144, arrive at inputs 148 and 150, respectively, separated by less than the predefined coincidence time difference $\Delta t$. Coincidence unit 146 also identifies, by means of an address signal, the location of the specific pair of segmented cathodes 110 and 112 that caused the production of the coincidence signal at output 152. The coincidence pulse at output 152 is fed into the control electrodes 154 and 156 to respectively open some of gates 122 and 128,. The gates 122 and 128 thus opened are those whose channels 116 and 118 are related only to the group of pixellated anodes 106 and 108 located above the specific pair of segmented cathodes 110 and 112 respectively that together produced the coincidence signal at output 152. The gates 122 of electronic channels 116, and gates 128 of electronic channels 118 remain open for a short time after receiving the coincidence signal at their control electrode. The opening time of gates 122 and 128 is adjusted to allow the transmission only of those pulses produced by preamplifiers 122 and 128 which are related to the coincidence event that triggered the opening of those gates by the relevant coincidence signal at the output of unit 146.

The signals transmitted by gates 122 and 128 are fed into signal processing units 124 and 130, which provide the corresponding energy of the absorbed photon and the location address of pixellated anodes 106 and 108. The information produced by units 124 and 130 is transmitted to an image-processing unit to construct an image of source 132.

The operating outcome of the above-described imaging system is that the pixellated cathode structure is used in order to accurately define the coincidence window $\Delta t$ within which it is determined that a coincidence event has occurred, and the particular regions behind that pair of pixellated cathodes where the absorptions occurred. The existence of a coincidence event is then used to open a longer window $\Delta t1$ for reading the charge signals only on those of the pixellated anodes opposite the pixallated cathodes which detected the coincidence event. The window $\Delta t1$ is long enough to enable a measurement to be made of the charges on those anodes from absorption of photons, regardless of the interaction depths within the detector bulk. The ratio between the area of a cathode segment and the complete detector head area is chosen such that the liklihood of absorptions from different events taking place within the defined group of anodes behind one cathode segment within the time $\Delta t1$ is very small. The charges appearing on an anode within the long window $\Delta t1$ can thus be assumed to come from the same coincidence event defined by the window $\Delta t$. A method for determining the required ratio between the area of a segmented cathode and the total area of a detector head is now given.

Assuming that source 132 is irradiating each of heads 102 and 104 at a rate of N photons per second, the irradiating rate R for each of segmented cathodes 110 and 112 is N/n, when n is the number of segmented cathodes 110 and 112 in each head. The corresponding average time $\Delta T$ between two successive events detected in heads 102 and 104 is given by:

$$\Delta T = 1/N$$

Similarly, the corresponding average time $\Delta T_1$ between two successive events in segmented cathodes 110 and 112 is given by:

$$\Delta T_1 32\ 1/R = n \times \Delta T$$

The maximum permissible area of segmented cathodes 110 and 112 is determined by two factors, the noise level of the cathode dark current, and the value of $\Delta T_1$. In a typical large area coincidence camera, the area of each of heads 102 and 104 is about 1200 cm², the detector thickness is 10 mm, and $N=10^8$ events per second. Accordingly the coincidence time window should be less than the average time $\Delta T$ between two successive events in heads 102 and 104 and thus should be less than 10 nanoseconds.

The average time $\Delta T_1$ between two successive events measured by electronic channels 116 and 118 which are related to the pair of segmented cathodes 110 and 112 which produce the coincidence pulse at output 152 of unit 146 is given by:

$$\Delta T_1 = \Delta T \times A/a = \Delta T \times n$$

where a is the area of each segmented cathode 110 and 112 and A is the area of each head 102 and 104.

To ensure that the events that are related to the coincidence event are transmitted by gates 122 and 128, $\Delta T_1$ should be longer than the maximum delay time of $\Delta T_2$ between signals appearing on anodes within the area opposite the cathode segments which produced the coincidence triggers. The different depth of interactions (as shown for photons 134–140), together with the small pixel effect of anodes 106 and 108, and the ballistic motion of the charge carriers in the bulk of the detector, are the main causes that produce this delay time $\Delta T_2$. For a 10 mm thick detector the maximum value of this delay time is about 1 microsecond and thus $\Delta T_1$ should be longer than 1 microsecond. This means that the ratio A/a=n, should be greater than $10^{+3}$. Since A=1200 cm², the area a of each of the segmented cathodes should be less than 1.2 cm². Such an area is also small enough to assure low dark current noise. While area a is small enough to maintain low noise, it is, on the other hand, big enough not to suffer from the small pixel effect, and thus is capable of producing fast response for coincidence measurement purposes.

It can be seen that the method of segmented cathodes fulfils all the operational requirements for a coincidence camera and would thus seem to be a very attractive technique. On the other hand, it is clear that each of heads 102 and 104 would need to include more that 1000-segmented cathodes. Usually detector heads 102 and 104 include multiple detector modules fabricated by Z technology, in which a chip-on-board ASIC is electrically connected to pixellated anodes 106 and 108 and on their sides. These chip-on-boards are physically and electrically attached to the detector crystals and contain within their ASIC's, all the electronic functions of channels 116 and 118. In the situation when all the electrical connections are designed to be on the anode sides, the large number of cathodes required (2000 for both of the heads) may introduce wiring problems, and may increase the noise level by introducing additional parasitic capacitance.

Figure 3A:
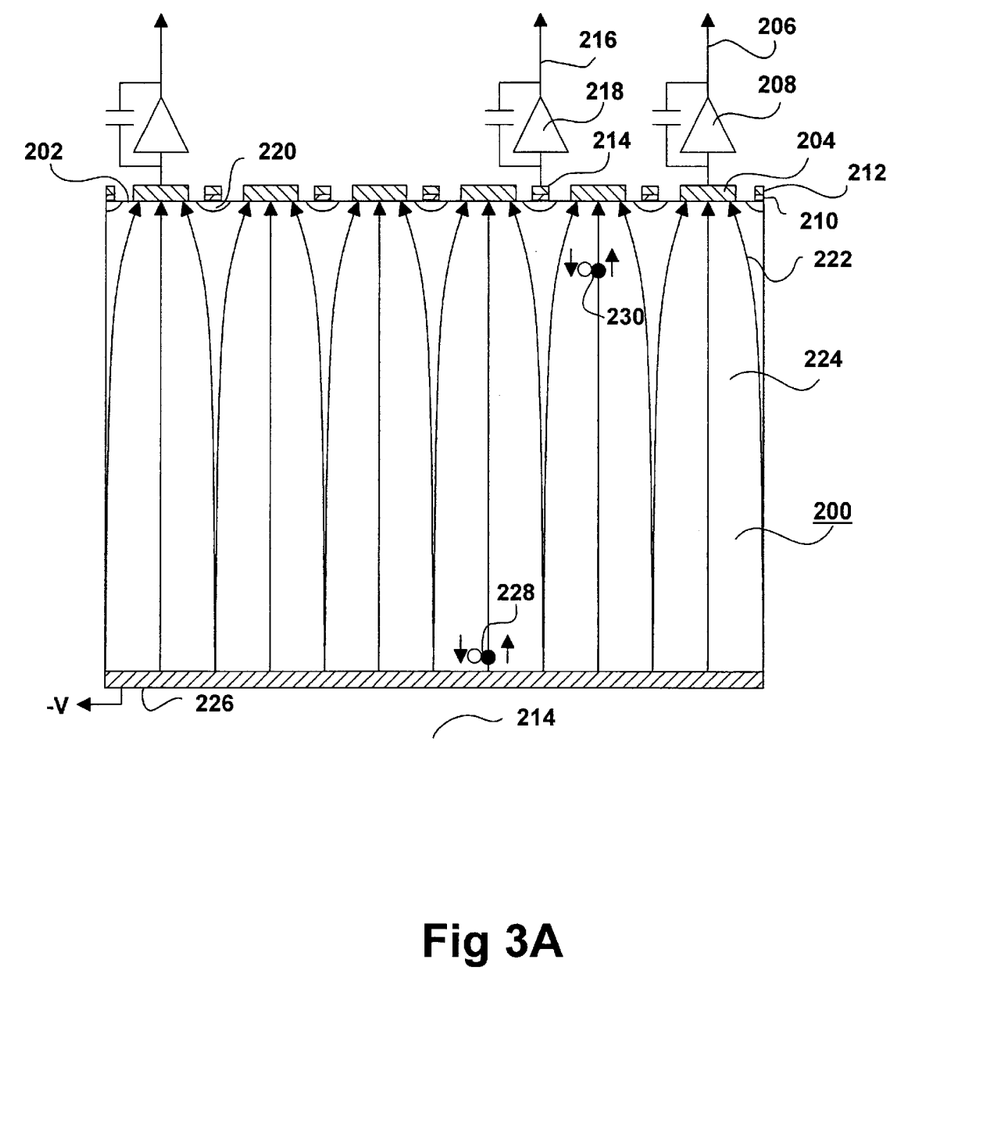
Figure 3B:
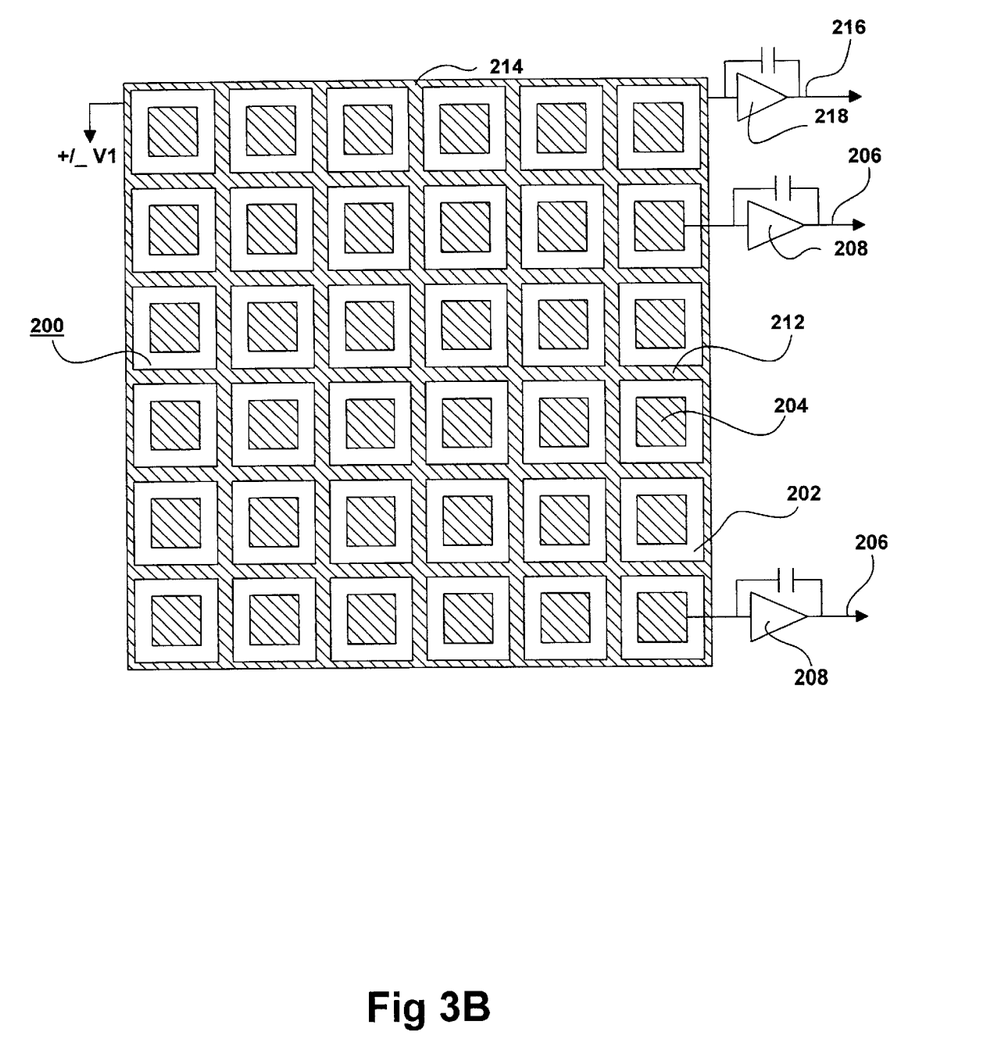
FIG. 3B is a plan view.

Reference is therefore made to FIGS. 3A and 3B, which are schematic illustrations of a pixellated semiconductor detector array 200, constructed and operative according to another preferred embodiment of the present invention, which allows the deriving of fast pulses for coincidence purposes using electrical connections on the top anode side 202 of detector 200. FIG. 3A is a schematic side view of detector 200 and FIG. 3B is a top view of the same detector. Surface 202 contains pixellated anodes 204 that are maintained at a ground potential or close thereto. Each anode is electrically connected to one of electronic channels 206 that include charge sensitive preamplifiers 208. At least part of the space between anodes 204 on surface 202 is covered with insulating material 210, and at least part of the insulating material 210 is covered by conductive material 212. In the embodiment shown, the insulating material 210 and conductive material 212 are preferably in the form of a grid 214, but they can also be formed in other shapes. For example, insulating material 210 can be painted, sprayed, deposited, chemically passivated bonded, taped or evaporated onto surface 202. Similarly, the conductive layer 212 can be applied on top of the insulating material 210 by processes similar to those mentioned above for the insulating material 210. Grid 214 is electrically connected to electronic channel 216 which includes charge sensitive preamplifier 218. Grid 214 is biased a t any desired potential $+/-V_1$ with any desired polarity provided that this bias is suitable for proper operation of electronic channel 216. For any potential and polarity, grid 214 produces depletion regions 220 under itself, even when grid 214 is electrically floating, as described in U.S. Pat. No. 6,034,373, to some of the inventors of the present application. U.S. Pat. No. 6,034,373 is hereby incorporated by reference, in its entirety Depletion regions 220 between anodes 204 increase the resistivity between the anodes along surface 202. The high resistivity between the anodes 204 causes the lines 222 of the electric field in the bulk 224 of detector 200, to be directed toward anodes 204, thus eliminating field lines like those shown in FIG. 1A as lines 36, directed toward the spaces between anodes 12 of detector 10. The cathode 226 is biased at a potential −V, which for a detector 220 made of CZT, and having a thickness of 10 mm, is in the range between −500 and −2500 volts.

Pairs 228 and 230 of electron-holes are produced by absorption of photons (not shown) in the bulk 224. The electrons of pairs 228 and 230 drift toward anodes 204 and the holes of these pairs drift toward cathode 226. The charge induced, on anodes 204, by the motion of the charge carriers (electrons and holes) in bulk 224 is converted into electronic signal by charge sensitive preamplifiers 208 of channels 206. These signals are used, in a similar way to that illustrated in FIG. 1A, and as explained above, to measure the energy of the photons absorbed in the bulk 224. The development of the induced charge on anodes 204, as a function of time, is similar to that shown in FIG. 1B as explained above.

On the other hand, the electronic signal derived from the induced charge on grid 214, by charge sensitive preamplifier 218 of channel 216 is different from that derived from the induced charge on anodes 204, by amplifiers 208 of channels 206. An analysis of this difference is now given, as previously under the justified assumption that the contribution of the hole motion to the induced charge is negligible.

The total effective included area of the surface of the detector crystal covered by grid 214 is large enough to avoid the small pixel effect. Grid 214 is a non-collecting electrode because there are no lines of electric field directed at it. In addition, insulating layer 210 and depletion regions 220 prevent any current flow from the bulk 224 into the grid 214, including dark current.

Figure 4:
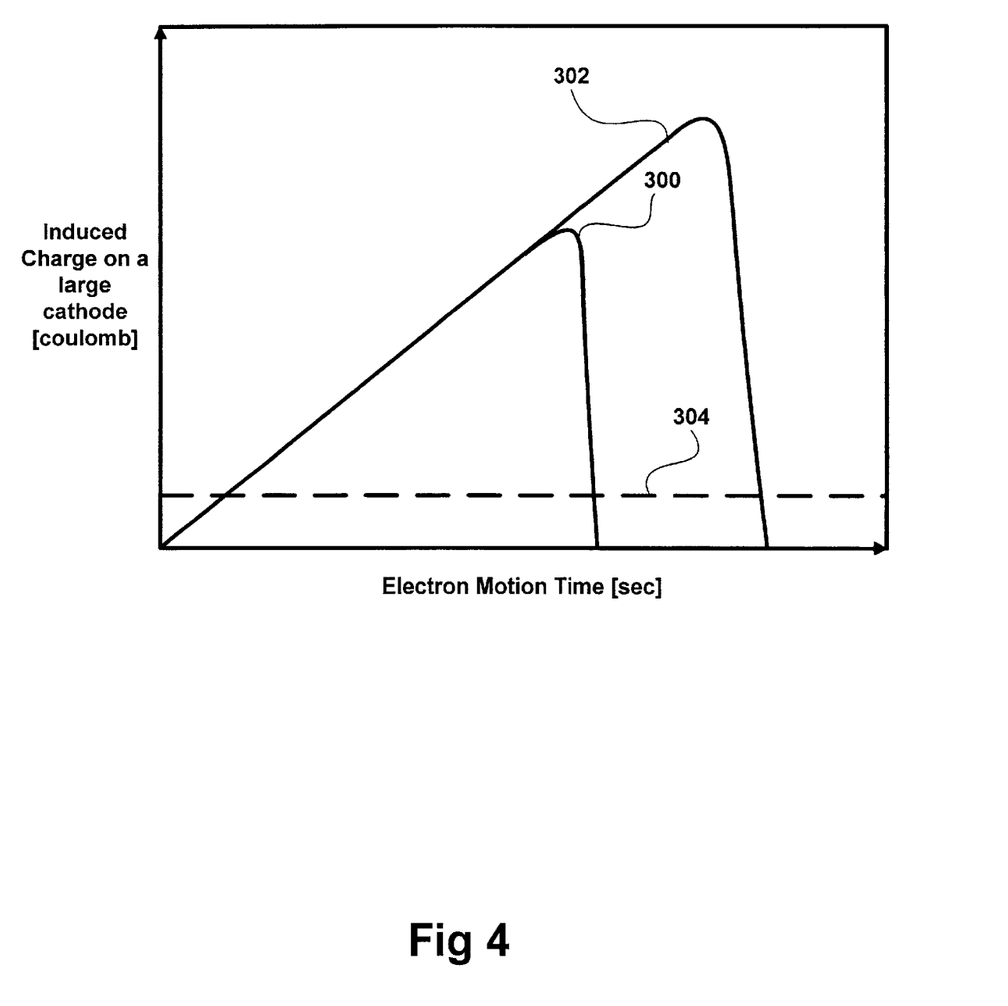
FIG. 4 is a graph of the time response of the induced charge on the grid of the embodiment shown in FIG. 3A, used to illustrate how the response time is independent of the point of interaction of the photon.

Reference is now made to FIG. 4, which is a graph of the induced charge on grid 214 of FIGS. 3A and 3B, as measured by preamplifier 218 of channel 216, as a function of the time of motion of the electrons of pairs 228 and 230. Curve 300 relates to the charge induced on grid 214 by the motion of the electron of pair 230. Similarly, curve 302 relates to the charge induced on grid 214 by the motion of the electron of pair 228.

As previously, FIG. 4 shows the induced charge produced only by the motion of the electrons, while ignoring the contribution of the hole movement. The contribution of the moving holes to the induced charge may be ignored for two reasons:

(a) The holes have a very low mobility in comparison to the electron mobility and thus most of them are trapped and recombine within the detector bulk without contributing significantly to the induced charge.

(b) Those holes which are not trapped and recombined, move so slowly that the rise time of the induced charge that they produce is much slower than the time constant of the shapers that follow the charge sensitive preamplifiers. Thus the hole contribution to the signal following the shaper is negligible in any case.

Since the effective area of grid 214 is much larger then thickness S of detector 200, there is no small pixel effect for this grid. Accordingly, the induced charge on grid 214 is linearly proportional to the distance moved by the electrons, regardless of where the electrons start their motion. Consequently, the starting point and the slope of curves 300 and 302 are identical. Curve 300 differs from curve 302 only in its peak value. This value is linearly proportional to the distance moved by the electrons. Thus the electron of pair 228 travels toward grid 214, (but is not collected there) a greater distance than the distance which the electron of pair 230 travels before collection by one of anodes 204. The peak in curve 302, produced by the electron of pair 228, thus occurs at a higher value than the peak of curve 300 which the electron of pair 230 produces. The last segments of the trajectories of the moving electrons are directed away from grid 214, thus allowing the electrons to be collected by anodes 204. In this situation, unlike curves 100 and 102 of FIG. 1B for the induced charge produced by moving electrons that are collected by the electrode on which the charge is induced (anodes 12 of FIG. 1A), curves 300 and 302 of the induced charge on grid 214, drop rapidly and immediately after peaking, to a zero value.

In order to derive the electronic signal produced by preamplifier 218, from the induced charge on grid 214 of FIGS. 3A and 3B, channel 216 includes a very fast shaper prior to its peak-and-hold. Slower conventional shapers such as those included in channels 206 of anodes 204 of FIGS. 3A and 3B are not suitable for electronic channel 216. The slower, conventional shapers would act as integrators to the signal produced by amplifier 218. The total integrated charge under curves 300 and 302 would then be zero. This zero value, in such a case, is what the peak-and-hold would detect.

From curves 300 and 302, it can be seen that if the motion of the electrons of pairs 228 and 230 starts simultaneously, the induced charge that each produces on grid 214, would be detected at the same moment in time, at which both curves 300 and 302 simultaneously cross the threshold value 304.

Curves 300 and 302 demonstrate the technique, according to this preferred embodiment of the present invention, of deriving a fast trigger from a large electrode in the form of a grid placed between pixellated anodes 204, whereby the time of the trigger is independent of the depth of interaction of the absorbed photons within the detector bulk. This trigger is used to identify which events in the two different heads of a coincidence camera are related to the same pair of a positron emission event. This identification is performed according to the criteria that photons which interact with the two different heads are derived from the same pair of positron emission, if their interaction within the detector occurs within a time window Δt which is shorter than the average time between two successive events.

Grid 214 of FIGS. 3A and 3B thus demonstrates a technique for deriving fast signals for a coincidence camera having the following advantages:

(a) The grid can be electrically connected on the same side of the detector as the anodes, and into a chip-on-board circuit.

(b) The grid does not suffer from excessive dark current, and thus does not suffer from noise due to this current.

While the fast signals derived from large grid 214 enable the measurements of time delays sufficiently short that they can function as coincidence triggers, there still remains a problem in identifying to which anode pixels the coincidence events are related, since the timing of the signals collected by the anodes is significantly affected by the absorption depth. The fast signals from large grids such as grid 214 of the two different heads of the coincidence camera, can detect a situation when two events in these heads occur within a time difference shorter than Δt, and thus are regarded as coincident. On the other hand the signals derived from the pixellated anodes 204 of FIGS. 3A and 3B are still dependent on the depth of interaction, so that events occurring simultaneously may be detected at time differences of up to 1 microsecond, which is much longer than Δt. In such a situation, events that occur in a certain order, may well be detected in the reverse order.

As a result, even though the use of large grids, such as grid 214, in the heads of the coincidence camera enable coincidence events to be correctly detected, there is still a problem to determine to which of the pixellated anodes in the camera head these coincident events are related.

Unlike large cathodes that introduce a high level of noise due to the high dark current that exists in the large area of the cathode, grid 214 of FIGS. 3A and 3B does not suffer from such noise.

It should be understood that grid 214 used to produce a fast triggering signal for coincidence purposes, could preferably be fabricated in different geometrical forms from the square form shown in FIG. 3B. The grid can also be produced with a different layer structure. For example, by removing insulating layer 210 from grid 214, the conductive layer 212 becomes in direct contact with the surface 202 of the bulk 224 of detector 200, as described in U.S. Pat. No. 5,677,539 for a "Semiconductor radiation detector with enhanced charge collection" assigned to the Digirad Corporation. The contact between conductive layer 212 and surface 202 of the semiconductor bulk 224 can preferably be an Ohmic contact or a blocking contact, and can be biased at any potential and polarity. The main disadvantages of using grid 214 without the insulating layer 212 and in direct contact to surface 202 are:

(a) Such a grid may suffer from high dark current and thus from high electronic noise.

(b) Such a grid may collect at least part of the charge produced by events occurring in the bulk 224 under the spaces between the anodes 204. In such a situation, even summing the signals over neighboring pixels will not enable the derivation of the original energy of the absorbed photons.

Figure 5:
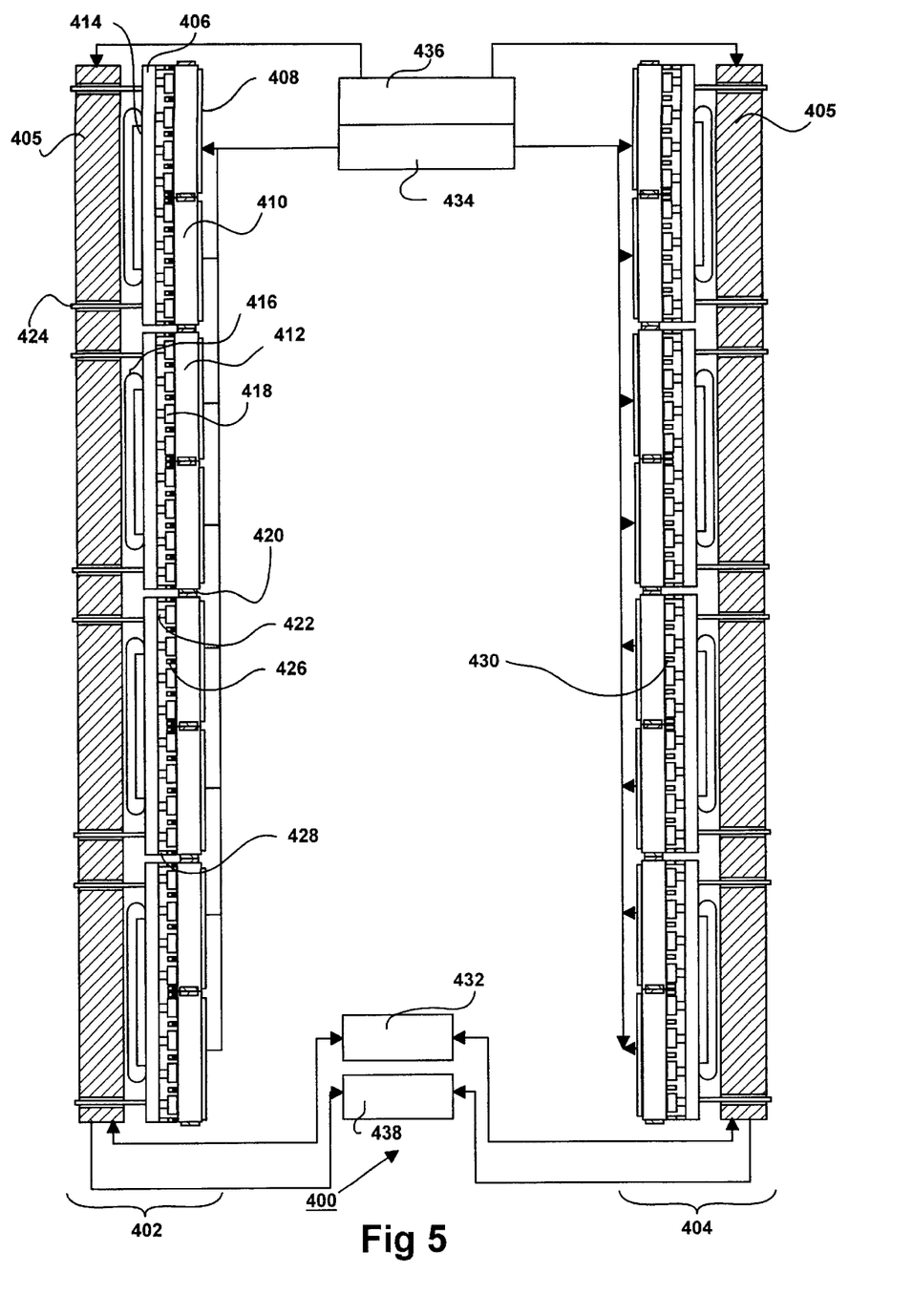
FIG. 5 is a schematic illustration of a further preferred embodiment of the present invention, showing a coincidence camera with two pixellated semiconductor detector array heads each having, on one side of the semiconductor crystal, pixellated anodes and a segmented grid array according to the embodiment shown in FIG. 4.

Reference is now made to FIG. 5, which is a schematic, cross-sectional, side view of detector heads 402 and 404, according to another preferred embodiment of the present invention, for use in a coincidence camera. Each of heads 402 and 404 include a Detector Carrier Board (DCB) 405. DCB 405 carries multiple chip-on-board's (COB) 406, which are tiled on DCB 405 to produce a focal plane array on the side of the cathodes 408 through which the bulk 410 of multiple detectors 412 receive the ionizing radiation. Each COB 406 carries at least one ASIC 414, having a shielding cover 416. Each of the multiple detectors 412, in a form of a square or rectangular semiconductor, such as CZT, includes cathodes 408 and multiple pixellated anodes 418.

In order to avoid unwanted edge effects, detectors 412 are surrounded along their circumference by double layer bands 420 having a conductive layer on top of an insulating layer, as described in the above-mentioned U.S. Pat. No. 6,034,373. Anodes 418 of detectors 412 are electrically connected to COB's 414 by bonding anodes 418 to electrical contacts 422 of the COB's 414. Contacts 422 are electrically routed to the inputs of ASIC's 414. ASIC's 414 preferentially have a separate electronic channel for each of anodes 418, each channel possibly including a charge sensitive preamplifier, a shaper, a peak-and-hold, digital and analog gates, and an analog to digital converter.

The signals from anodes 418 are fed into the channels of ASIC's 414 and processed there. The output signals are transferred from ASICs 414 to DCB's 404 by means of multiple connection mounting pins 424. Each of detectors 412 includes grids 426, similar to those shown in the embodiments of FIGS. 3A and 3B, which are forming between the anodes 418 on the surface of detectors 412. The grids 426 preferably contain two layers, the first insulating layer being attached to the surface of detectors 412, and the second conductive layer being disposed on top of the first insulating layer. Each grid 426 of each of the detectors 412 is electrically connected to the COB's 414 by means of contacts 428. Since each grid 426 is electrically associated only with the detector module on which it is located, the grid structure is segmented, like the cathode structure on the opposite side of each detector module. According to an additional preferred embodiment of the present invention, the module may include several segments of segmented grid array 426.

Usually, detector head 404 is identical to detector head 402. In the embodiment shown in FIG. 5, detector head 404 is identical to detector head 402 accept for grid 430, which is shown in a different configuration from grid 426 of head 402, to demonstrate further preferred embodiments of the present invention. Grid 430 is also located in the spaces between anodes 418, but differs in that it is made of conductive material in direct contact with the surface of detectors 412. Grids 426 and 430 are formed above a surface large enough for eliminating the small pixel effect, and thus are suitable for producing fast pulses for the triggering mechanism of coincidence cameras.

The coincidence logic of the system of FIG. 5 is similar to that shown in FIG. 2. Electronic channels, such as channels 116 and 118 of FIG. 2, with all their constituent components, are included within ASICs 414. Coincidence unit 432 is equivalent to coincidence unit 146 of FIG. 2, with its preamplifiers 142 and 144. Unit 432 receives the trigger signals from grids 426 and 430, together with the information about the address of the specific segmented grids that produced the coincidence trigger signals. Thus unit 432 controls the gates in the channels of ASICs 414 in the same way that units 146 of FIG. 2, control gates 122 and 128 of channels 116 and 118, respectively, allowing the transmission only of the coincidence signals from anodes 418 related to the above mentioned specific grids involved in the coincidence process.

In the system of FIG. 2, the size of segmented cathodes 110 and 112 is small enough to assure that only the signals that are related to pixellated anodes 106 and 108 located above the segmented cathodes 110 and 112 that produced the coincidence events will be transferred out by gate systems 122 and 128. Similarly, grids 426 and 430 are also segmented grids and their size is small enough to assure proper identification of the events that coincide. This means that only the signals that are related to pixellated anodes 418 distributed within the specific grids 426 and 430 that produced the coincidence events, will be transferred out by gate systems equivalent to the gate systems 122 and 128 of FIG. 2, which in the embodiment of FIG. 5, are included in ASIC's 414.

Cathodes 408 of detectors 412 are biased at negative voltage by high voltage power supply 434. The anodes 418 of detectors 412, the grids 426 and 430, and the ASIC's 414 are biased by other outputs of power supply 436, through the DCB's 404 and through pins 424 of the COB's 406.

The signals of the two events identified as being in coincidence, one from head 402 and the other from head 404, are transferred together with the information about the energy and the address of the events to image processing unit 438 for constructing an image of the radiation source.

Figure 6:
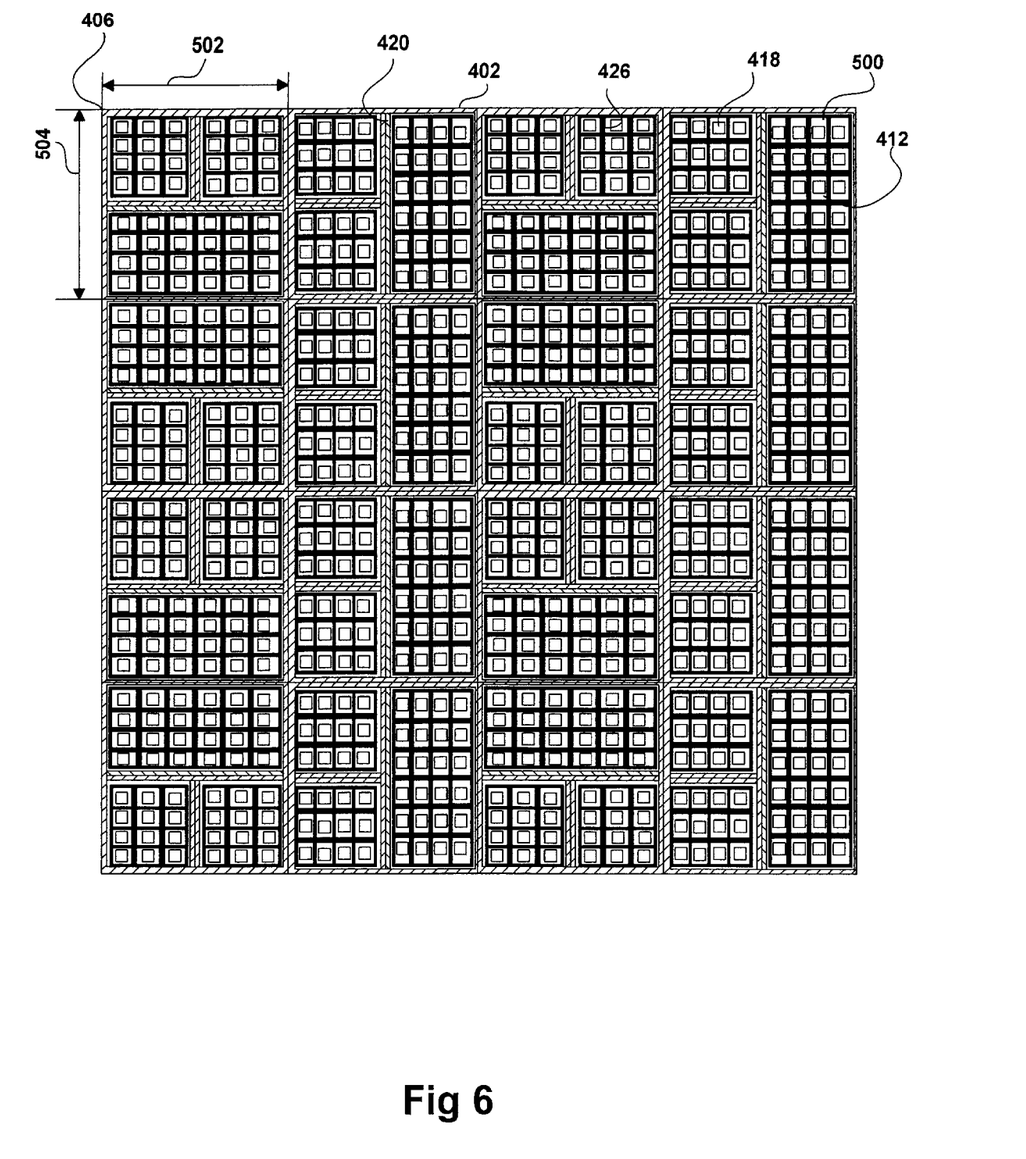
FIG. 6 is a schematic plan view of the focal plane array of a detector head according to the embodiment shown in FIG. 5; consisting of an array of pixellated anodes and segmented grids formed by tiling separate detector modules.

Reference is now made to FIG. 6, which is a schematic plan view of the focal plane array of a detector head 402 of FIG. 5, according to another preferred embodiment of the present invention. Plane 500 consists of an array of pixellated anodes 418 and segmented grids 426 formed by tiling detectors 412. Plane 500 includes tiled modules of COB's 406 having length 502 and width 504. Each detector 412 and each module 406 is surrounded by a band 420.

Figure 7:
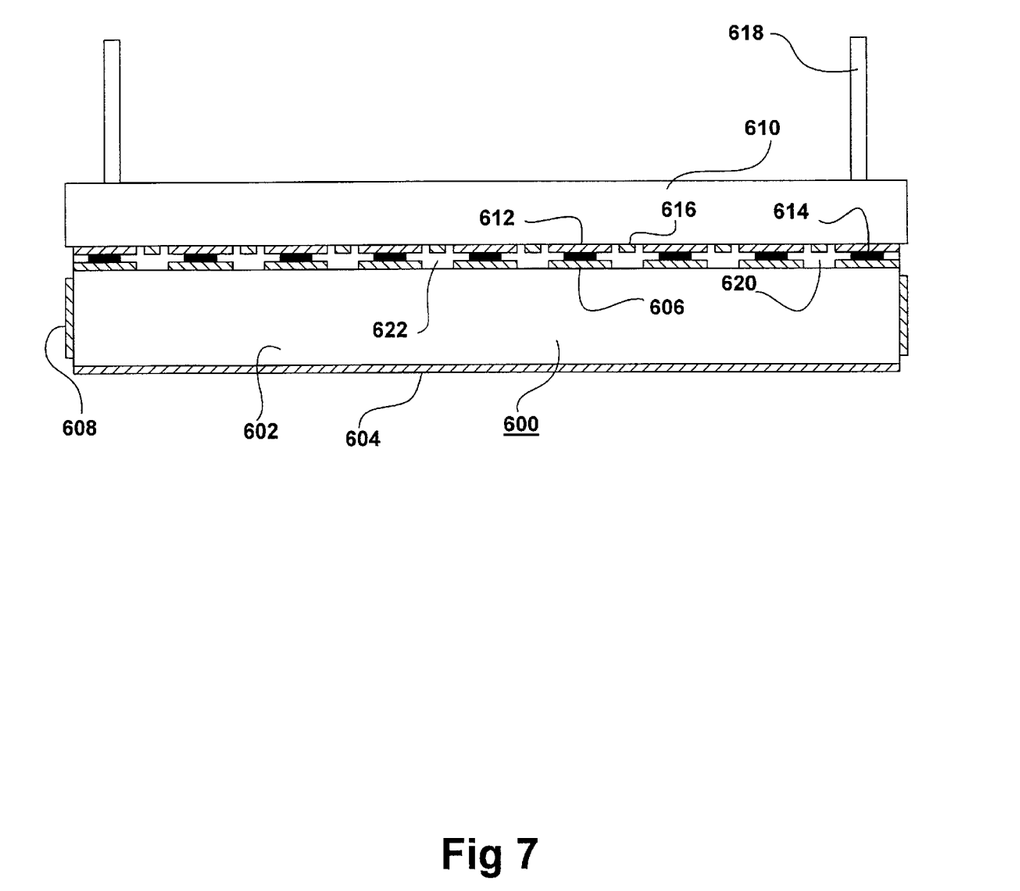
FIG. 7 is a schematic side view cross-section of a single module according to another preferred embodiment of the present invention, such as could be used in the embodiment shown in FIG. 6.

Reference is now made to FIG. 7, which is a schematic side view cross-section of a single module according to another preferred embodiment of the present invention. Such modules may be used to construct a focal plane array of a nuclear camera by means of a tiling technique. Module 600 is preferably constructed on one detector crystal constituting a pixellated semiconductor detector array 602, having a cathode 604 and pixellated anodes 606. Detector 602 is surrounded all along its circumference, by band 608 for reducing unwanted edge effects. Chip-on-board 610, includes multiple pixellated contacts 612, that are electrically connected and attached to anodes 606 by a conductive glue or epoxy 614. COB 610 has a conductive grid 616 located in the spaces between anodes 606. COB 610 has electronic inputs/output pins 618 by which COB 610 is mounted on a DCB (not shown). The volume 620 confined between anodes 606, contacts 612 and under grid 616, are preferably filled with an insulating polymer material 622, such as a polyimide, or an insulating epoxy such as U-300, a liquid underfill encapsulant, manufactured by Epoxy Technology Incorporated, of Billerica, Mass., USA. Such materials may be inserted to fill volumes 620 by means of a wicking process. The above process effectively produces grids 616 consisting of a conductive layer on top of an insulating layer 622 attached to detector 602.

The non-collecting grid 616 built into module 600, like the other grids illustrated in the previous Figures, is used to produce fast triggering signals for coincidence cameras. Grid 616 differs from the previously illustrated grids in the manner by which it is constructed. While the layers of the previous illustrated grids are formed on the detector crystal prior to the attachment of the detectors to the COB's, the conductive layer of grid 616 is formed first on COB 610 and the insulating layer 622 is formed during or after the attachment of detector 602 to COB 610.

It will be appreciated by persons skilled in the art that the present invention is not limited by what has been particularly shown and described hereinabove. Rather the scope of the present invention includes both combinations and sub-combinations of various features described hereinabove as well as variations and modifications thereto which would occur to a person of skill in the art upon reading the above description and which are not in the prior art.

We claim:

1. A semiconductor coincidence detector device comprising:
   at least a first and a second detector crystal array, each having a first and second surface;
   an array of pixellated anodes formed on each of said first surface;
   an array of segmented cathodes formed on each of said second surface;
   essentially each of said pixellated anodes being connected to an anode electronic channel for generating a first electrical signal corresponding to the energy of a photon impinging in said semiconductor; and
   essentially each of said segmented cathodes being connected to a cathode electronic channel for generating an electrical coincidence trigger signal on detection of a photon impinging in said semiconductor, said first electrical signal being read only from anodes located opposite said cathode segment generating said trigger signal.

2. A semiconductor coincidence detector device according to claim 1 and wherein said detector crystal comprises cadmium zinc telluride.

3. A semiconductor coincidence detector device according to claim 1 and wherein said segmented cathodes generally have an area which is significantly larger than that of said pixelated anodes, such that each segmented cathode has a plurality of pixelated anodes located opposite it.

4. A semiconductor coincidence detector device according to claim 3, wherein the time of generation of said first electrical signal by said pixelated anodes varies according to the depth of interaction of said photon impingement in said semiconductor, and wherein said segmented cathodes have an area which is sufficiently large that said electrical coincidence trigger signal on detection of said photon impingement is generated in a time significantly shorter than the variation in time of generation of said first electrical signal by said pixelated anodes.

5. A semiconductor coincidence detector device according to claim 4 and also comprising coincidence circuitry for indicating the occurrence of an event, and wherein the occurrence of an event is indicated when a cathode segment from said first array of detector crystals and a cathode segment from said second array of detector crystals each generate an electrical coincidence trigger signal separated by a time significantly shorter than the variation in time of generation of said first electrical signal by said pixelated anodes.

6. A semiconductor coincidence detector device according to claim 5 and also comprising gates which enable reading of said first electrical signals generated by said pixelated anodes, and wherein said coincidence circuitry also indicates the location of said cathode segment generating said electrical coincidence trigger signal, and wherein said coincidence circuitry is operative to open only those gates associated with anode electronic channel of those pixelated anodes located opposite each segmented cathode.

7. A semiconductor coincidence detector device according to claim 6 and wherein said coincidence circuitry holds said gates open for a time longer than the variation in time of generation of said first electrical signal by said pixelated anodes.

8. A semiconductor coincidence detector device comprising:
   at least a first and a second detector crystal array, each having a first and second surface;
   an array of pixellated anodes formed on each of said first surface;
   an array of segmented grids formed on each of said first surface, around said pixellated anodes;
   essentially each of said pixellated anodes being connected to an anode electronic channel for generating a first electrical signal corresponding to the energy of a photon impinging in said semiconductor; and
   essentially each of said segmented grids being connected to a segmented grid electronic channel for generating an electrical coincidence trigger signal on detection of a photon impinging in said semiconductor, said first electrical signal being read only from anodes located within the area of said grid segment generating said trigger signal.

9. A semiconductor coincidence detector device according to claim 8 and wherein said detector crystal comprises cadmium zinc telluride.

10. A semiconductor coincidence detector device according to claim 8 and wherein said segmented grids generally have an area which is significantly larger than that of said pixelated anodes, such that each segmented grid includes a plurality of pixelated anodes.

11. A semiconductor coincidence detector device according to claim 10, wherein the time of generation of said first electrical signal by said pixelated anodes varies according to the depth of interaction of said photon impingement in said semiconductor, and wherein said segmented grids have an area which is sufficiently large that said electrical coincidence trigger signal on detection of said photon impingement is generated in a time significantly shorter than the variation in time of generation of said first electrical signal by said pixelated anodes.

12. A semiconductor coincidence detector device according to claim 11 and also comprising coincidence circuitry for indicating the occurrence of an event, and wherein the occurrence of an event is indicated when a segmented grid from said first array of detector crystals and a segmented grid from said second array of detector crystals each generate an electrical coincidence trigger signal separated by a time significantly shorter than the variation in time of generation of said first electrical signal by said pixelated anodes.

13. A semiconductor coincidence detector device according to claim 12 and also comprising gates which enable reading of said first electrical signals generated by said pixelated anodes, and wherein said coincidence circuitry also indicates the location of said grid segment generating said electrical coincidence trigger signal, and wherein said coincidence circuitry is operative to open only those gates associated with anode electronic channel of those pixelated anodes located within each segmented grid.

14. A semiconductor coincidence detector device according to claim 13 and wherein said coincidence circuitry holds said gates open for a time longer than the variation in time of generation of said first electrical signal by said pixelated anodes.

15. A semiconductor coincidence detector device according to claim 8 and also comprising chip-on-board modules attached to said first surface such that both said pixelated anodes and said segmented grids are connected to said chip-on-board modules without transfer of connections across said crystal arrays.

16. A semiconductor coincidence detector device according to claim 15 and wherein said array of segmented grids is formed on said chip-on-board module, and also comprising an insulating compound filling the interstitial space between said first surface and said chip-on-board module.

17. A semiconductor coincidence detector device according to claim 8 and wherein at least one of said detector crystals has an insulated conducting band around its circumference.

* * * * *